Oct. 24, 1933.  C. A. DUPUIS  1,931,605
WINDSHIELD CLEANER
Filed Feb. 13, 1932
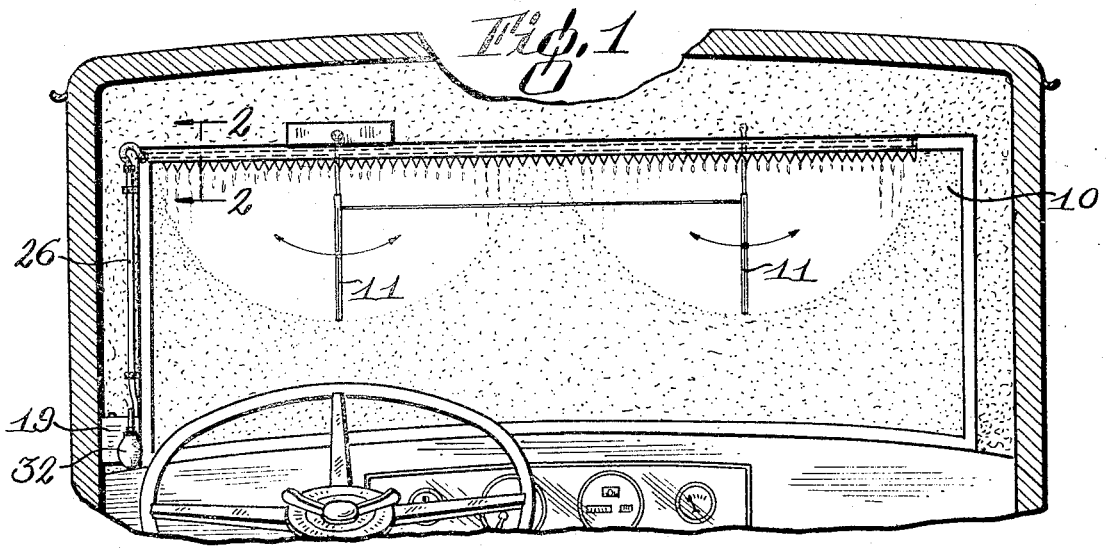
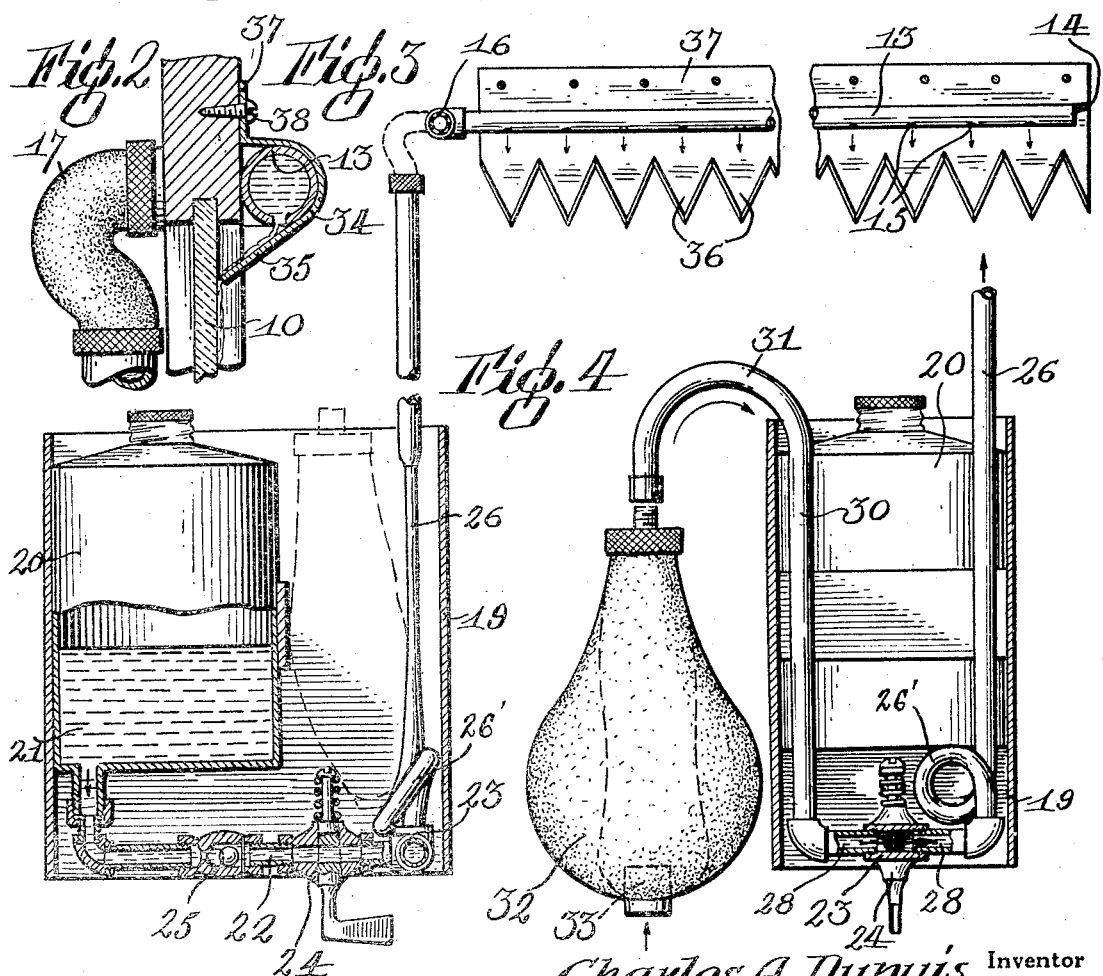
Charles A. Dupuis Inventor
By Marion V. Marier
Attorneys Patented Oct. 24, 1933

1,931,605

UNITED STATES PATENT OFFICE 1,931,605

WINDSHIELD CLEANER

Charles Auguste Dupuis, Montreal, Quebec, Canada

Application February 13, 1932, Serial No. 592,821, and in Canada October 3, 1931

1 Claim. (Cl. 20—40.5)

The present invention relates to improvements in windshield cleaning apparatus and has for its primary object the provision of a cleaner adapted to maintain the windshield of a vehicle clear of ice, snow and other matter which might obstruct vision through the windshield.

A further object of the invention is the provision of windshield cleaning apparatus designed so that a cleaning fluid will be distributed in a relatively uniform manner over the front face of the windshield.

Another object of the invention is the provision of a cleaning apparatus of the above type having means for selectively discharging a determined quantity of cleaning fluid over the windshield.

Still another object of the invention is the provision of an apparatus of the above type which will be relatively simple in construction, which may be conveniently attached to the windshield of a motor vehicle and which will be reliable and efficient in operation.

Other objects and advantages of the invention will become apparent as the description progresses.

In the accompanying drawing forming a part of this specification and in which like reference characters are employed to designate corresponding parts throughout the same:

Figure 1 is a transverse fragmentary section through the forward portion of a motor vehicle showing the improved apparatus installed thereon, Figure 2 is an enlarged fragmentary transverse section taken on the line 2—2 of Figure 1, Figure 3 is an enlarged elevational view of the cleaner apparatus partly in section, and Figure 4 is a transverse sectional view through the lower casing portion thereof.

Referring to the drawing, wherein for the purpose of illustration is shown a preferred embodiment of the invention, the numeral 10 generally designates a conventional form of windshield attached to the front of a motor vehicle. Operatively connected with the windshield 10 and the windshield frame are shown a pair of adjustable windshield wipers 11.

Attached to the outer side of the upper frame bar of the windshield 10 and extending horizontally thereon is an elongated discharge header 13, preferably in the form of a straight pipe section enclosed at one end, as indicated at 14. The bottom of the header 13 is perforated, that is, at regularly spaced intervals are provided discharge openings 15. To the open end of the header 13 is connected an angle fitting 16, one leg of which extends through the windshield frame and has connection, at the inner side of the windshield, with a connecting conduit 17 which may comprise a flexible section of metal tubing.

At one side of the windshield and adjacent the bottom thereof is secured a casing 19 open at the ends and having mounted therein a tank 20 providing a reservoir for a supply of cleaning fluid, indicated at 21.

Connected to a nipple extending from the lower end of the reservoir 20 and having communication with the interior thereof is a horizontally extending conduit, generally indicated at 22, the opposed end having connection with a three way fitting 23. Mounted in the horizontal conduit 22, adjacent the fitting 23, is a control valve 24, through the medium of which the passage of cleaning fluid may be selectively controlled. Between the valve 24 and the tank outlet is disposed a check valve 25 mounted so as to permit discharge of the fluid from the tank but to obviate return passage thereof.

To one outlet of the fitting 23 is connected the bottom end of a vertical conduit 26, the upper end of this conduit being connected with the connecting tube 17 and the lower end being looped as shown at 26'.

From a side outlet of the fitting 23 is extended a relatively short horizontal pipe section 28 connected to an upstanding extension pipe section 30, bent at the upper end to form an inverted U-shaped extension 31. To the outer end of the extension 31 is detachably connected a collapsible pressure bulb 32 having the usual valve 32.

Mounted in association with the transversely extending discharge header 13 is an elongated distributing member 34 embodying a flat plate 35 extending at a downward inclination from the outer side of the header to the upper portion of the windshield glass 10. The plate 35 is serrated at the outer edge to form a plurality of uniformly spaced distributor teeth 36, the lower pointed ends of which are disposed to assume positions closely adjacent the windshield. The intermediate portion of the distributor member 34 is preferably formed of arcuate cross section so as to lie concentrically over the outer portion of the header and is provided with a vertical flange 37 adapted to be positioned against the outer side of the windshield frame and provided with apertures for connection with the frame by means of screws 28 or other fastening elements.

When vision through the windshield becomes obstructed, as for instance by an accumulation of ice on the outer side thereof, the glass may be quickly and conveniently cleaned by compressing the bulb 32 which will cause a supply of the cleaning fluid to flow from the tank 20 through the conduits and into the header 13. The fluid is discharged downwardly through the apertures 15 in the header and onto the distributor plate 35, the apertures 15 being disposed so that they will register with the teeth 36 on the plate so as to conduct the fluid downwardly on the teeth and onto the windshield to cause the liquid to flow in uniformly spaced streams down the windshield glass.

As the fluid preferably comprises glycerine and alcohol, alcohol alone or other non-freezing liquids and forms a relatively thin film over the glass, the latter is protected against the accumulation of snow or ice thereon and operative movement of the wipers 11 will provide particularly clear sections for suitable visibility through the shield. The valve 25 will prevent the return flow of the fluid to the tank while the control valve 24 will enable restriction or entire cut-off of the feed line.

Due to the connection of pipe 26 with reservoir 20, it is evident that the level of liquid in 26 will correspond to that of 20. Therefore, it is clear that when the reservoir is full more liquid will be discharged than when it is nearly empty. To correct this condition, and provide constant discharge as much as possible, a loop is provided at the bottom of 26, to permit an accumulation of the fluid, whereby the level differences existing in the upper part of 26 will be negligible compared to the bulk of liquid in loop 26'. Consequently, a substantially uniform discharge volume from the reservoir will be possible, whether said reservoir is full or nearly empty. To further enhance this effect, the tube or conduit 26 may be constricted as shown in Figure 2.

It is to be understood that the form of my invention herein shown and described is to be taken as a preferred example of the same, and that various changes as to the shape, size and arrangement of parts may be resorted to without departing from the spirit of the invention or the scope of the subjoined claim.

Having thus described my invention, I claim:—

In apparatus of the character described, including a perforated discharge header mounted in association with the upper portion of a windshield, and a reservoir adapted to contain a quantity of anti-freezing cleaning fluid, a conduit connecting the reservoir to the header and leading from the bottom of said reservoir, a compression bulb connected to the conduit for blowing air at the lower portion of said conduit and thus displace the fluid, normally falling therein by gravity from the reservoir, into the header, and a check valve in the conduit connecting the tank to the header to prevent the fluid backing up into the tank, the bulb being furthermore disposed above the highest fluid level possible into the reservoir.

CHARLES AUGUSTE DUPUIS.